(12) United States Patent
Chan et al.

(10) Patent No.: US 11,314,101 B2
(45) Date of Patent: Apr. 26, 2022

(54) OPTICAL DRIVING MECHANISM HAVING CURVED CONNECTING SURFACE AND ASSEMBLY METHOD FOR THE SAME

(71) Applicant: TDK TAIWAN CORP., Taoyuan (TW)

(72) Inventors: Yi-Liang Chan, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 748 days.

(21) Appl. No.: 16/165,386

(22) Filed: Oct. 19, 2018

(65) Prior Publication Data
US 2019/0121158 A1 Apr. 25, 2019

Related U.S. Application Data

(60) Provisional application No. 62/574,390, filed on Oct. 19, 2017.

(51) Int. Cl.
*G02B 27/64* (2006.01)
*G02B 7/02* (2021.01)
(Continued)

(52) U.S. Cl.
CPC ............ *G02B 27/646* (2013.01); *G02B 7/02* (2013.01); *G02B 7/025* (2013.01); *G02B 7/04* (2013.01); *G02B 7/09* (2013.01)

(58) Field of Classification Search
CPC .......... G02B 7/02; G02B 7/023; G02B 7/025; G02B 27/646; G02B 7/04–105;
(Continued)

(56) References Cited

U.S. PATENT DOCUMENTS

2012/0147489 A1* 6/2012 Matsuoka .............. G02B 7/025
359/819
2012/0218649 A1* 8/2012 Konishi .................. G02B 7/08
359/813
(Continued)

FOREIGN PATENT DOCUMENTS

| CN | 101191890 A | 6/2008 |
|---|---|---|
| CN | 102036004 A | 4/2011 |
| CN | 104469107 A | 3/2015 |

OTHER PUBLICATIONS

Chinese Office Action with Search Report issued in corresponding Application No. 201811221271.4, dated Feb. 3, 2021, 9 pages.

*Primary Examiner* — Ryan S Dunning
(74) *Attorney, Agent, or Firm* — Muncy, Geissler, Olds & Lowe, P.C.

(57) ABSTRACT

An optical driving mechanism is provided, including a fixed portion, a movable portion and a driving assembly. The movable portion includes a holder and an optical element, wherein the holder is configured to sustain the optical element, and the optical element has a lens barrel and at least one lens. The driving assembly is configured to drive the movable portion to move relative to the fixed portion. A first connecting surface of the holder abuts a second connecting surface of the lens barrel, and at least one of the first connecting surface and the second connecting surface has a curved surface, wherein in the optical axis direction of the lens and in the direction perpendicular to the optical axis, the first connecting surface at least partially is overlapping the second connecting surface.

15 Claims, 16 Drawing Sheets

(51) Int. Cl.
*G02B 7/04* (2021.01)
*G02B 7/09* (2021.01)

(58) Field of Classification Search
CPC .... G03B 2205/0007; G03B 2205/0015; G03B 2205/0023; H04N 5/2254; H04N 5/23287
See application file for complete search history.

(56) References Cited

U.S. PATENT DOCUMENTS

| 2018/0309913 A1* | 10/2018 | An | G02B 7/022 |
| 2018/0329277 A1* | 11/2018 | Han | H04N 5/225 |
| 2019/0235193 A1* | 8/2019 | Komiyama | G02B 7/021 |
| 2021/0223500 A1* | 7/2021 | Hirao | G02B 5/005 |

* cited by examiner

OPTICAL DRIVING MECHANISM HAVING CURVED CONNECTING SURFACE AND ASSEMBLY METHOD FOR THE SAME

CROSS REFERENCE TO RELATED APPLICATIONS

This application claims the benefit of U.S. Provisional Application No. 62/574,390, filed on Oct. 19, 2017, the entirety of which is incorporated by reference herein.

BACKGROUND OF THE INVENTION

Field of the Invention

The application relates in general to an optical driving mechanism, and in particular to an optical driving mechanism that includes a holder and an optical element.

Description of the Related Art

Thanks to ongoing technological developments, recent electronic devices (such as tablet computers and smartphones) usually include a lens module capable of aiding in photography or recording video, and some are even equipped with dual lens modules, bringing users a wealth of visual enjoyment. However, an image may come out blurry if the user shakes the lens module in the electronic device when using it. To improve image quality, it is increasingly important to design an effectively shockproof lens module. In addition, designers are currently pursuing the miniaturization of such devices, and it is expected that electronic products will be smaller and lighter with each successive generation. Therefore, how to design an optical mechanism with a better optical compensation function with a smaller volume through a special configuration is an important issue.

In addition, in the conventional lens module, the lens element and the holder are often assembled by threading or screwing, for example, the corresponding threads are disposed outside the lens barrel of the lens element and inside of the holder. However, the assembly with the threaded design requires a large volume, and the threaded engagement method cannot elastically adjust the relative inclination between the lens and the holder/the photosensitive element. It is a big challenge for the trend of pursuing miniaturized, high-quality devices today.

BRIEF SUMMARY OF INVENTION

To address the deficiencies of conventional products, an embodiment of the invention provides an optical driving mechanism, comprising a fixed portion, a movable portion and a driving assembly. The movable portion includes a holder and an optical element, wherein the holder is configured to sustain the optical element, and the optical element has a lens barrel and at least one lens. The driving assembly is configured to drive the movable portion to move relative to the fixed portion. A first connecting surface of the holder abuts a second connecting surface of the lens barrel, and at least one of the first connecting surface and the second connecting surface has a curved surface, wherein in the optical axis direction of the lens and in the direction perpendicular to the optical axis, the first connecting surface at least partially is overlapping the second connecting surface.

In some embodiments, the frame assembly at least includes four string arms, wherein the curved surface is not parallel to the optical axis. In some embodiments, both the first connecting surface and the second connecting surface are curved surfaces, wherein the radius of curvature of the first connecting surface is greater than or equal to the radius of curvature of the second connecting surface.

In some embodiments, the holder has a plurality of first connecting surfaces abutting the second connecting surface and surrounding the optical axis, and at least two contact areas are formed between the first connecting surfaces and the second connecting surface, wherein there is a gap between the first connecting surfaces, wherein the second connecting surface has a curved surface, and the first connecting surface has an inclined structure which is inclined relative to the optical axis. The first connecting surface and the second connecting surface are located at the light incident end or the light exit end of the optical driving mechanism.

In some embodiments, the optical driving mechanism further comprises an adhesive disposed between the holder and the lens barrel of the optical element. The lens barrel has a recess portion formed on the outer side of the lens barrel, and the adhesive is disposed in the recess portion and between the lens barrel and the holder. The holder has a receiving slot located at a light incident end of the optical driving mechanism, and the adhesive is disposed in the receiving slot. The inner side wall of the holder has a recess, configured to receive the adhesive. The first connecting surface and the second connecting surface are located at either the light incident end or the light exit end of the optical driving mechanism, and the adhesive is located at the other of the light incident end or the light exit end.

An embodiment of present invention provides an assembly method of an optical driving mechanism, comprising: providing an optical driving mechanism, the optical driving mechanism at least includes a movable portion, a fixing portion, and a driving assembly, wherein the movable portion includes an optical element and a holder, and the driving assembly is configured to drive the movable portion to move relative to the fixed portion; placing the optical element in the holder; applying an adhesive between the optical element and the holder for connection; orienting an optical axis of a lens of the optical element perpendicular to a reference surface of the fixed portion; and curing the adhesive.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical systems are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
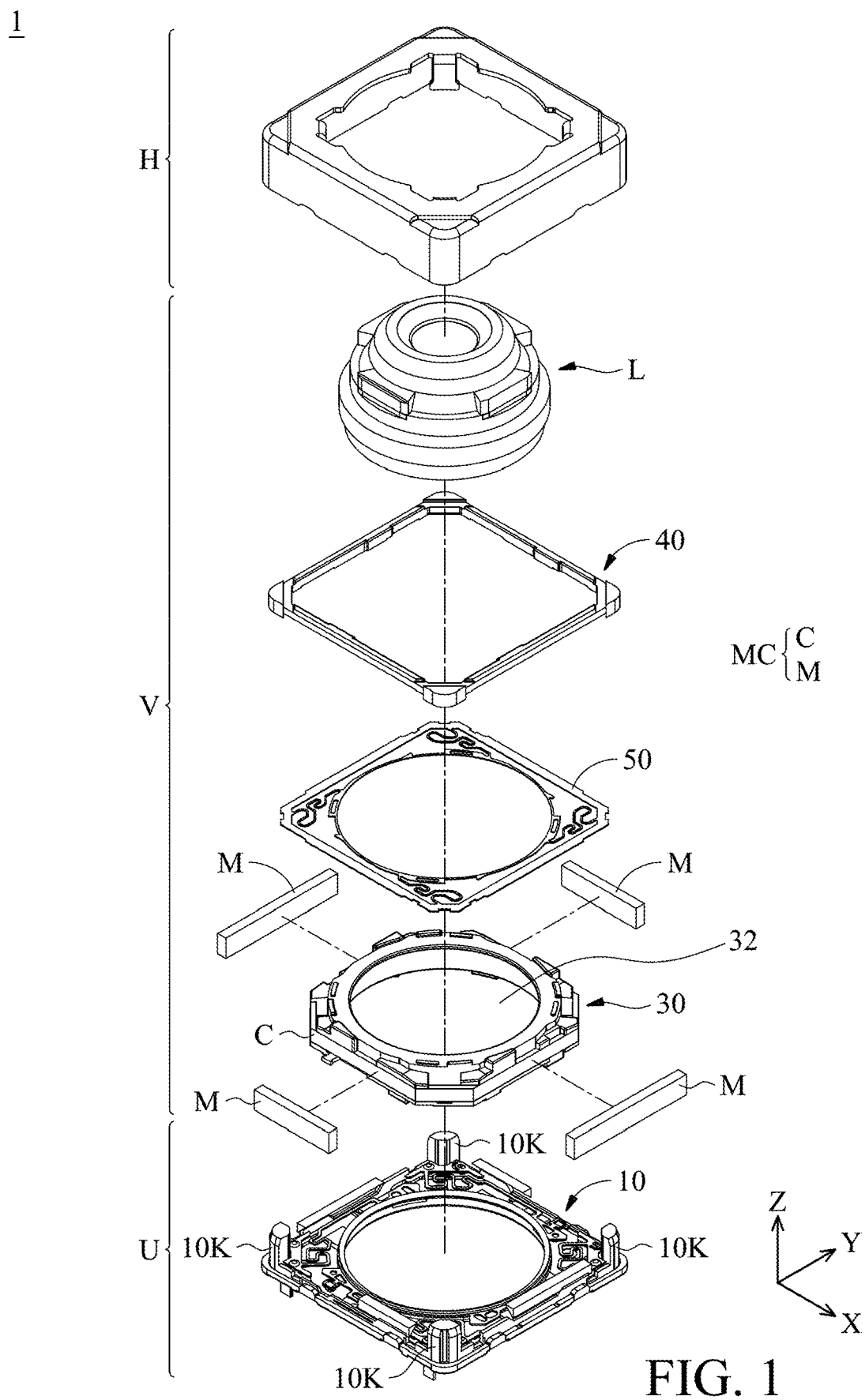
FIG. 1 is an exploded view diagram of an optical driving mechanism according to an embodiment of the present invention.
Figure 2:
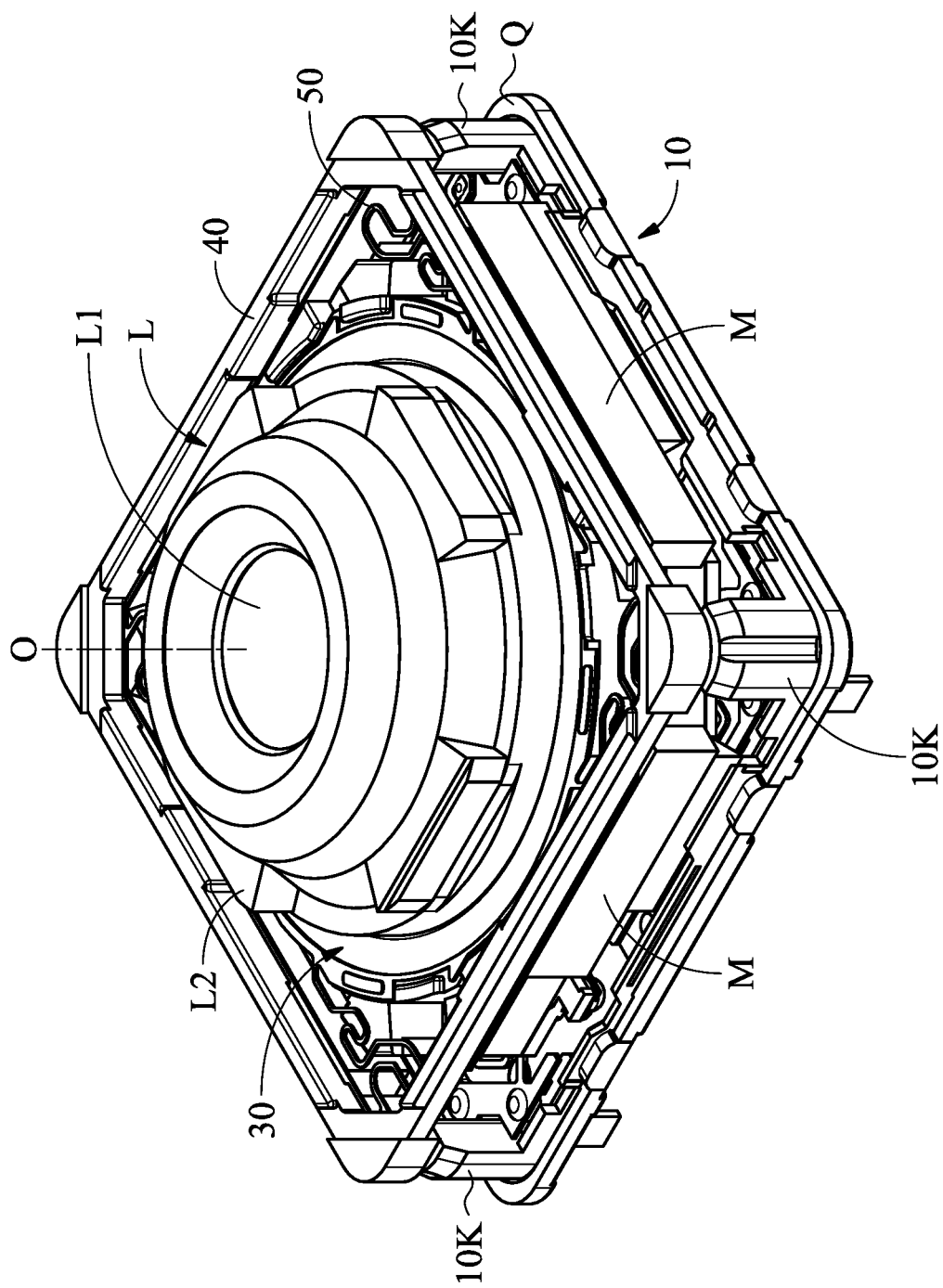
FIG. 2 is a schematic diagram of the optical driving mechanism in FIG. 1 after assembly (the housing H is omitted).

Referring to FIGS. 1 and 2, FIG. 1 is an exploded view showing the optical driving mechanism 1 according to an embodiment of the present invention, and FIG. 2 is a schematic view showing the assembled optical driving mechanism 1 (the housing H is omitted). The optical driving mechanism 1 can be used, for example, to drive and sustain an optical element L (such as a camera lens), and can be disposed inside an electronic device (such as a camera, a tablet or a mobile phone). The optical driving mechanism 1 primarily comprises a housing H, a movable portion V, a fixed portion U and a driving assembly MC. The housing H and a base 10 of the fixed portion U are connected to form a receiving space, which is configured to receive the movable portion V and the driving assembly MC and protect them. The movable portion V includes a holder 30 and an optical element L (such as a camera lens), wherein the holder 30 is configured to sustain the optical element L. When light (incident light) from the outside enters the optical driving mechanism 1, the light passes through the optical element L disposed in the holder 30 along the direction of an optical axis O of a lens (or optic) L1 of the optical element L, and then to an image sensor (not shown; for example, it can be affixed to the base 10), to acquire an image.

Continuing referring to FIGS. 1 and 2, the movable portion V is disposed on the fixed portion U and includes the aforementioned holder 30, a frame 40, an upper leaf spring 50 and a lower leaf spring 60. The driving assembly MC includes a plurality of magnetic elements (such as magnets) M and a coil C. The frame 40 is disposed outside the holder 30, and the magnetic elements M are disposed on the frame 40. The coil C is disposed around the holder 30, and the magnetic elements M are disposed surrounding the holder 30 and face the coil C. The upper and lower leaf springs 50 and 60 are movably connects the holder 30 and the frame 40, so that the holder 30 is movable relative to the frame 40.

The coil C and the magnetic elements M of the driving assembly MC are corresponding. The driving assembly MC can be an electromagnetic driving assembly. An external power supply (not shown) applies a driving signal (for example, a driving current) to the coil C to generate a magnetic force with the magnetic elements M1 to drive the holder 30 to move relative to the frame 40 and an image sensor disposed on the fixed portion U. Moreover, the upper and lower leaf springs 50 and 50 allow the holder 30 to maintain an initial position relative to the frame 40 before the driving signal is applied. In this embodiment, the driving assembly MC is a moving-coil type; in another embodiment, it may be a moving-magnetic type.

In some embodiments, the optical driving mechanism 1 further comprises a plurality of elongated elastic members, for example, four suspension wires (not shown) are correspondingly disposed at positions of the four protrusions 10K of the base 10, and movably connecting the base 10 of the fixed portion U and the upper leaf spring 50 of the movable portion V, which can further increase the mobility and stability of driving the movable portion V relative to the fixed portion U via the driving assembly MC. In other embodiments, only one elastic member may be used with a suitable guiding mechanism (e.g., a slide rail), or other number (e.g., two or three) of elastic members are provided. In addition, the driving assembly MC may further include a plate coil (not shown) disposed on the base 10 and coupled to the magnetic elements M. Similar to the magnetic force generated between the magnetic elements M and the coil C by applying a driving signal, another magnetic force can also generated between the magnetic element M and the flat coil by applying a driving signal, and the movable portion V can be moved relative to the base 10 and the image sensor disposed thereon (for example, moving on the XY plane), to achieve offset compensation and shockproof effects.

The connection structure and configuration of the holder 30 and the optical element L of the movable portion V will be described in detail below.

Figure 3A:
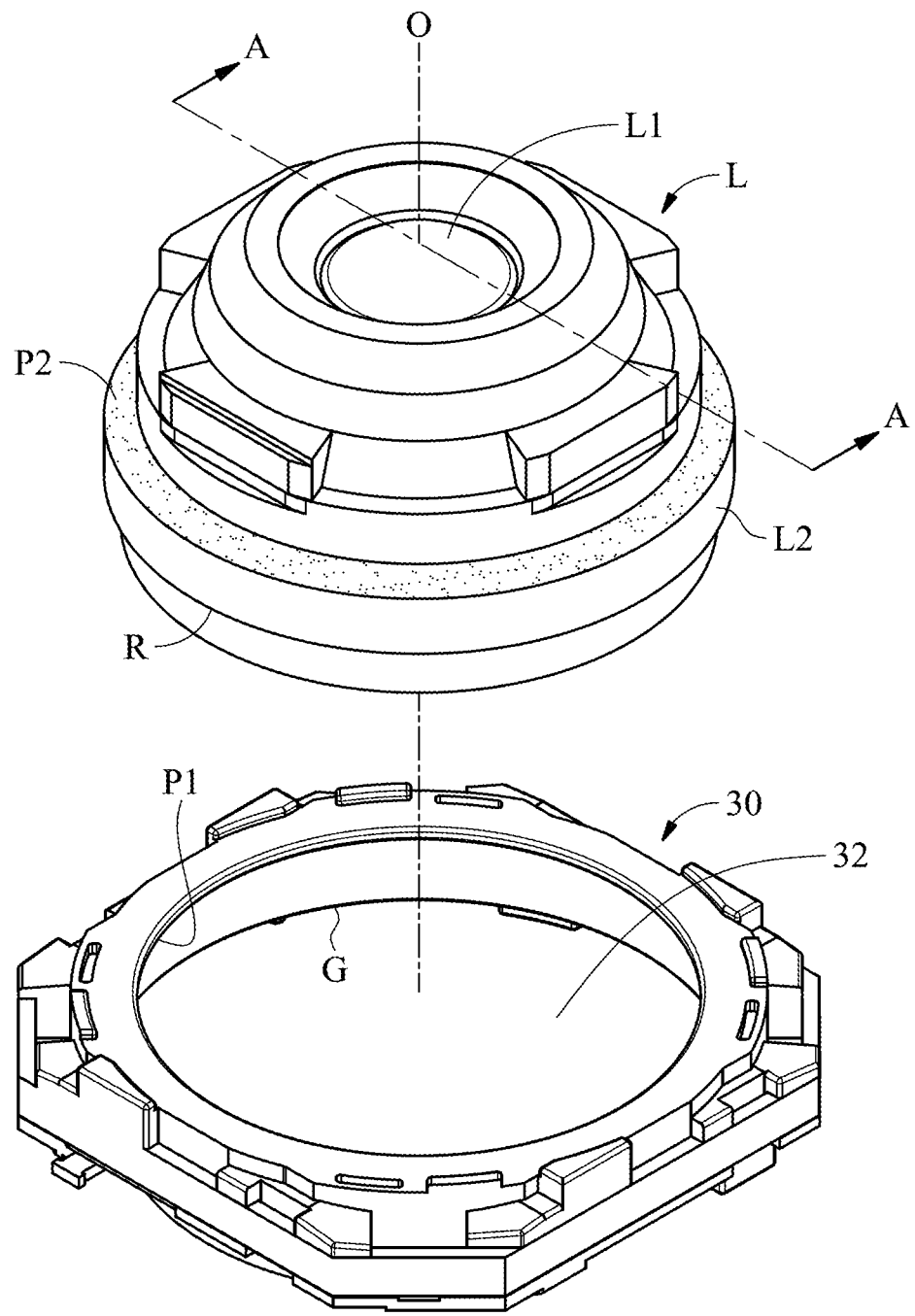
FIG. 3A is a schematic diagram of the holder and the optical element in FIG. 1.
Figure 3B:
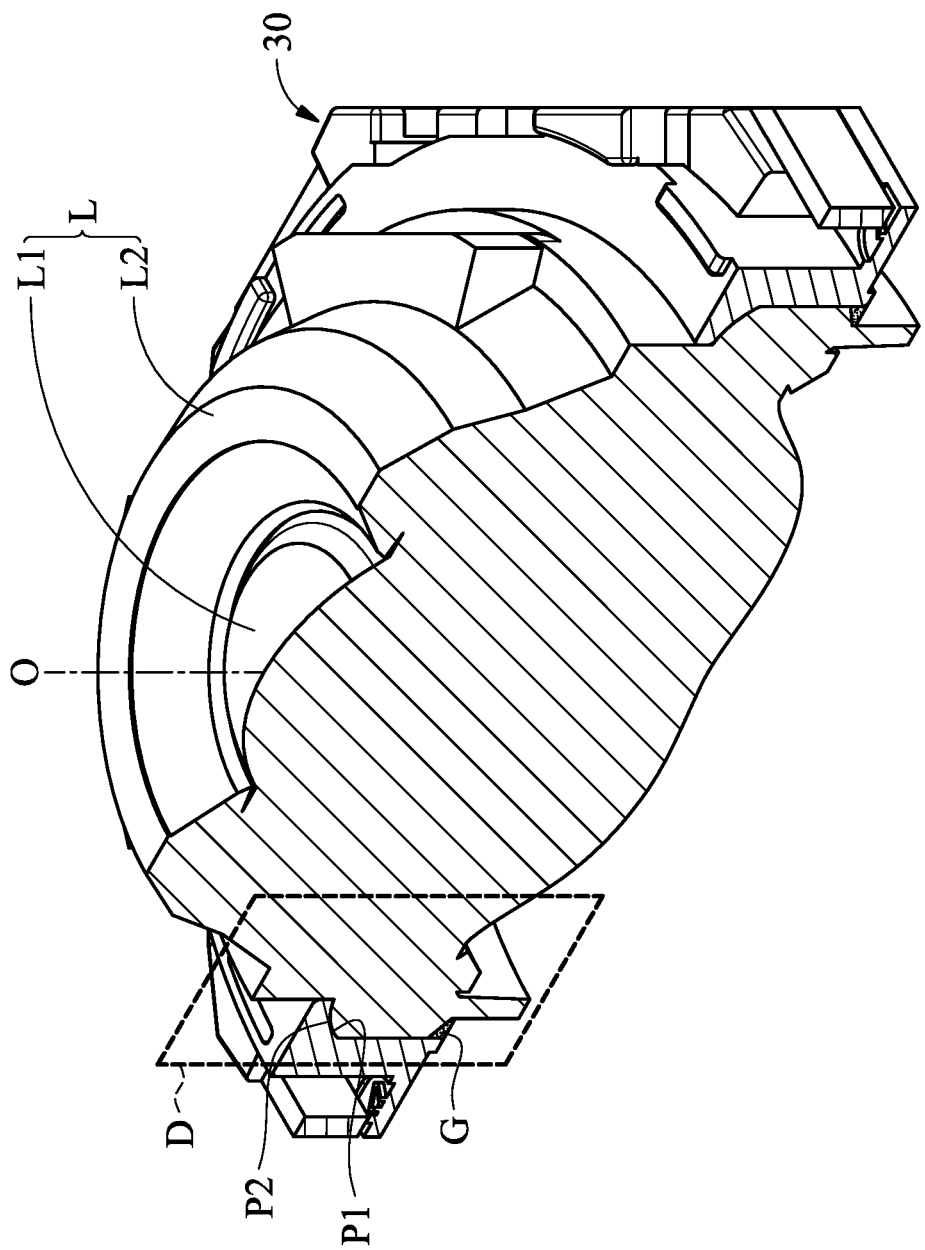
FIG. 3B is a cross-section view diagram of the holder and the optical element after assembly taken along line A-A in FIG. 3A.

FIG. 3A is a schematic view of the holder 30 and the optical element L, and FIG. 3B is a schematic cross-sectional view of the holder 30 assembled with the optical element L and taking along the line A-A in FIG. 3A. The foregoing holder 30 is used to carry and protect the optical element L. When performing optical focusing or optical vibration compensation, the driving element MC drives the holder 30 with the optical element L together to move relative to the image sensor on the base 10 (of fixing portion U). The optical element L includes a lens L1 and a lens barrel L2. The lens barrel L2 can serve as a casing for loading the lens L1. The holder includes a hollow portion 32, for containing the lens barrel L2. In other embodiments, the optical element L can include a plurality of lenses or a lens assembly.

Figure 3C:
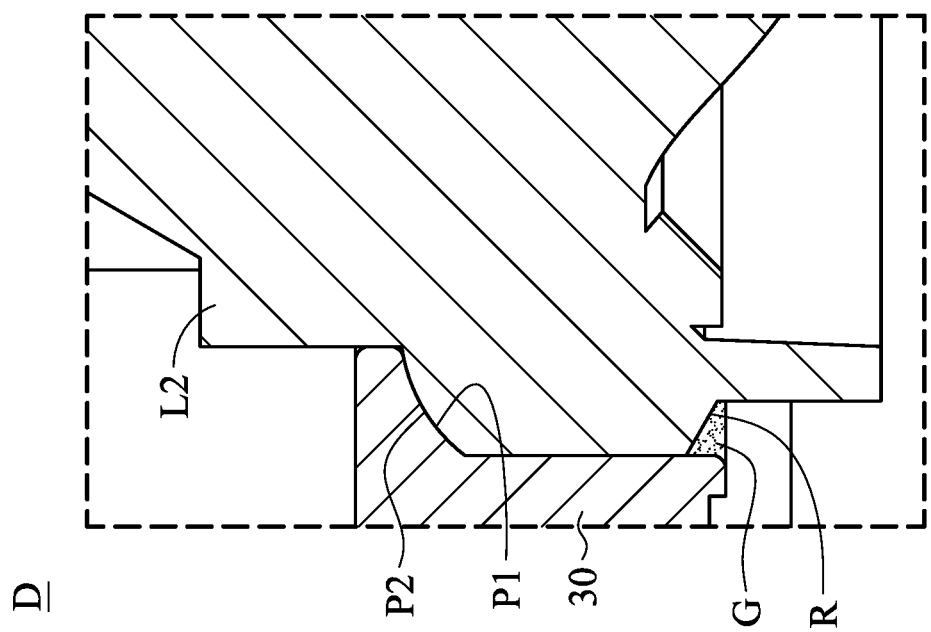
FIG. 3C is an enlarged diagram of region D in FIG. 3B.

In the present embodiment, the holder 30 and the optical element L abut each other. Specifically, referring to FIGS. 3A and 3B, the inner side wall of the holder 30 has an annular first connecting surface P1, which is located on the upper end of the main body of the member 30, or is located at the light incident end of the optical driving mechanism 1. The first connecting surface P1 abuts against a second connecting surface P2 of the lens barrel L2 of the optical element L. FIG. 3C is an enlarged schematic view of a region D in FIG. 3B. The first connecting surface P1 and the second connecting surface P2 each have an arc-shaped curved surface (or curved structure), and the curved surfaces are not parallel to the optical axis O of the lens L1. When the holder 30 and the optical element L are assembled, the curved surfaces of the first and second connecting surfaces P1 and P2 are abutted against each other. Compared to the optical lens and the holder connected by threads or screws, this design not only greatly saves the space occupied by the connection structure, but also can elastically adjust the position of the optical element L relative to the holder 30 and the fixed portion U during the assembly, thereby to determine the relative inclination of the optical element L, the holder 30 and the fixed portion U, to increase the quality of the overall optical mechanism.

Please continue to refer to FIGS. 3A-3C, the optical driving mechanism 1 further comprises an adhesive G disposed between the holder 30 and the lens barrel L2 of the optical element L for connecting the two. In detail, the aforementioned adhesive G may include, for example, a resin material. In a direction parallel to the optical axis O, the adhesive G is located at the lower end of the holder 30 (opposite sides from the upper end), or is located at a light exit end of the optical driving mechanism 1; and in the direction perpendicular to the optical axis O, the adhesive G is located between the holder 30 and the optical element L. As shown in FIG. 3C, the outer side of the lens barrel L2 of the optical element L has an annular recessed portion R for the adhesive G to be disposed. In the procedure of assembling the optical element L to the holder 30, the adhesive G may be applied from the bottom side of the holder 30 (i.e., the aforementioned lower end; the light exit end), and the first and second connecting surfaces P1 and P2 having curved surfaces located at the upper end are abutting each other. At this time, the position of the optical element L relative to the holder 30 or the fixed portion U can be adjusted, for example, the horizontal bearing surface Q (see FIG. 2) of the base 10 of the fixed portion U as a reference surface, the optical axis O is perpendicular to the reference surface, so that the optical element L may be prevented from being tilted or skewed relative to the holder 30 or the fixed portion U or the degree of tilt is adjusted to an acceptable level, to improve product quality. In some embodiments, the radius of curvature of the first connecting surface P1 is greater than or equal to the radius of curvature of the second connecting surface P2, which can effectively improve the assembly ease and the connection strength.

It should be noted that, referring to FIG. 3C, viewed in the direction of the optical axis O and viewed in a direction perpendicular to the optical axis O, the first connecting surface P1 at least partially overlaps the second connecting surface P2. Therefore, the space occupied by the connection mechanism of the holder 30 and the optical element L can be saved, not only reducing the volume, but also giving a more flexible arrangement space for other components in the optical driving mechanism 1.

Figure 4A:
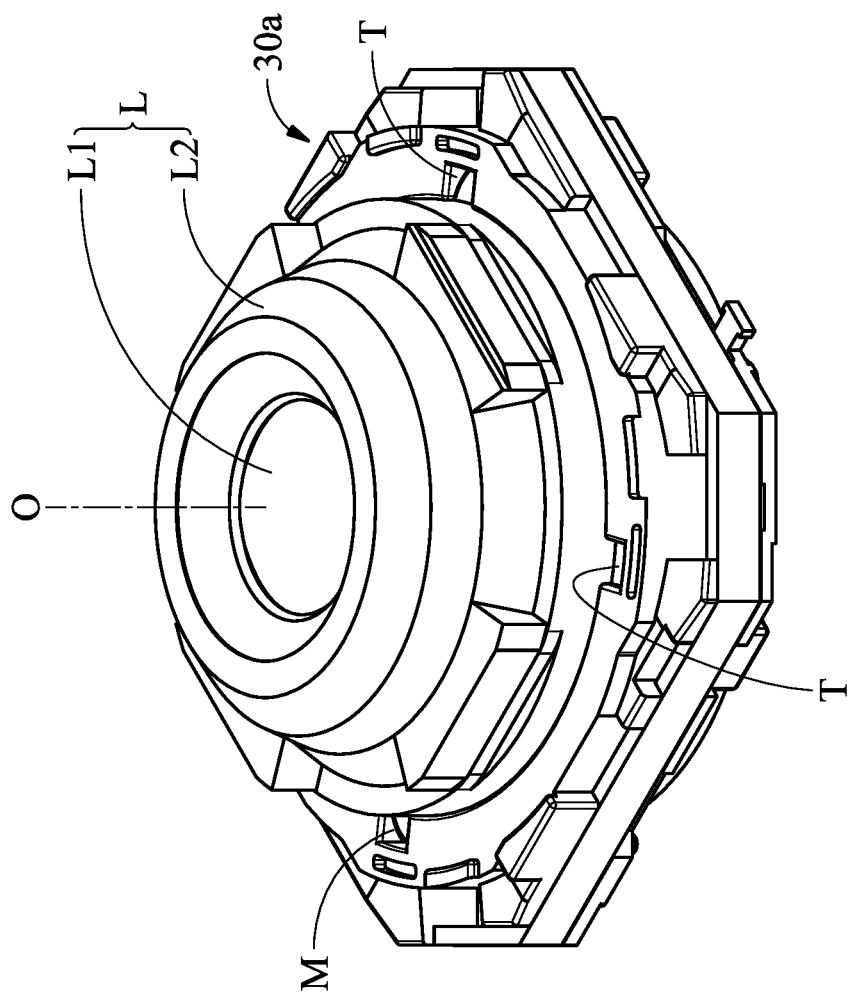
FIGS. 4A to 4C are schematic diagrams of a holder and an optical element according to another embodiment of the present invention.
Figure 4B:
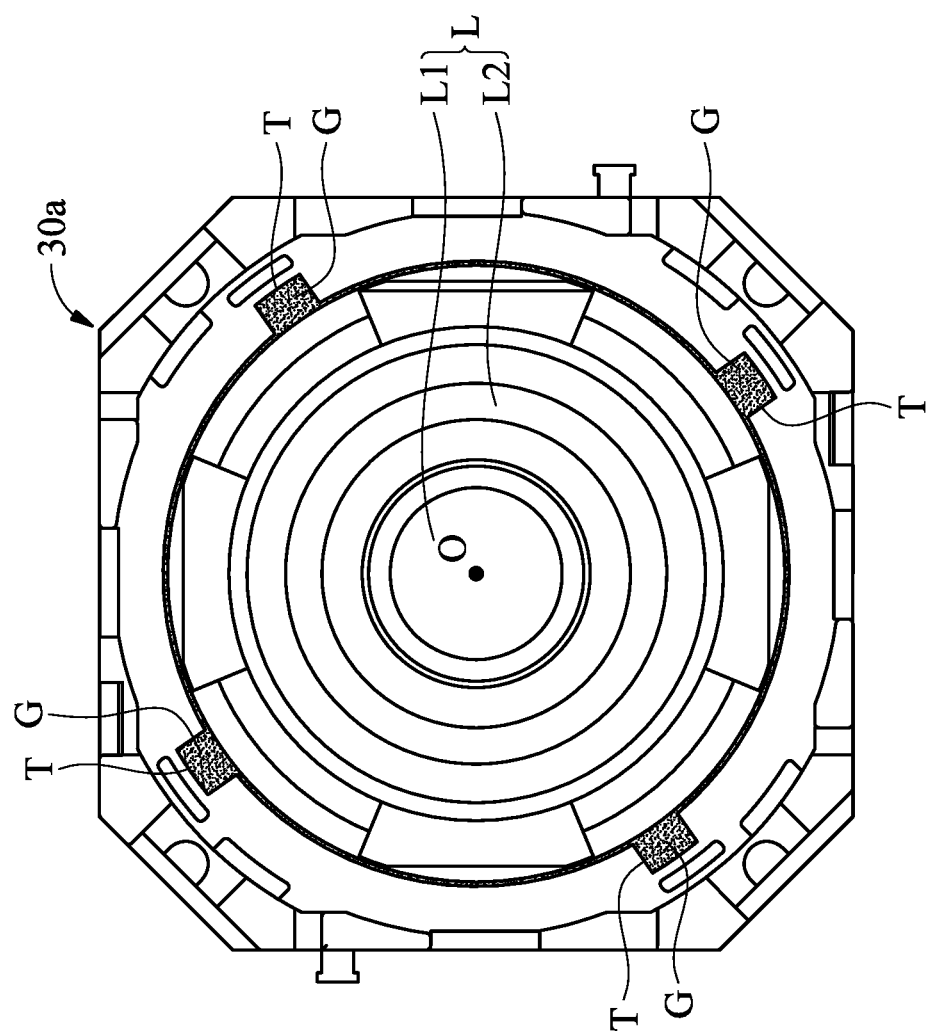
Figure 4C:
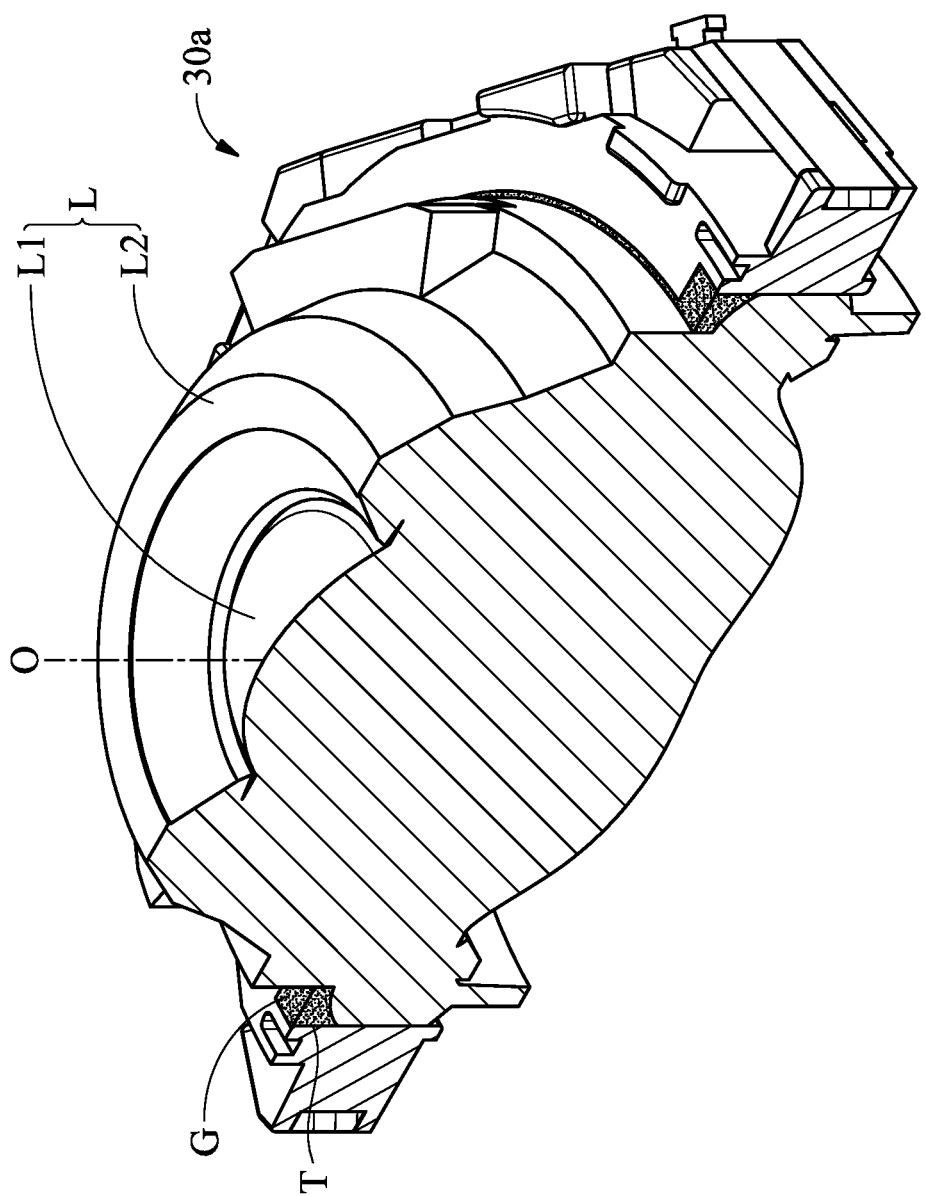

FIGS. 4A-4C are schematic views of a holder 30a and the optical element L according to another embodiment of the present invention. The main difference between the holder 30a in this embodiment and the holder 30 in FIG. 3A is that the upper end of the holder 30a has a plurality of receiving slots T located at the light incident end, which is configured to receiving adhesive G so that the holder 30a and the optical element L are connected/adhered to each other. In this embodiment, the adhesive G is applied to the receiving groove T from the upper end of the holder 30a or from the light incident end, which is different from the adhesive G being applied from the bottom side of the holder 30 G in FIG. 3C. The adhesive G applied to the receiving slots T from the upper end can flow to the gap between the optical element L and the holder 30 for connection. In this way, considering the configuration of other components in the optical driving mechanism 1, optional mounting the holder 30 or 30a, the assembly of the holder and the optical lens are flexible, and the positional structure of other components inside the optical driving mechanism 1 can be adapted, thereby making a more appropriate combination configuration.

Figure 5:
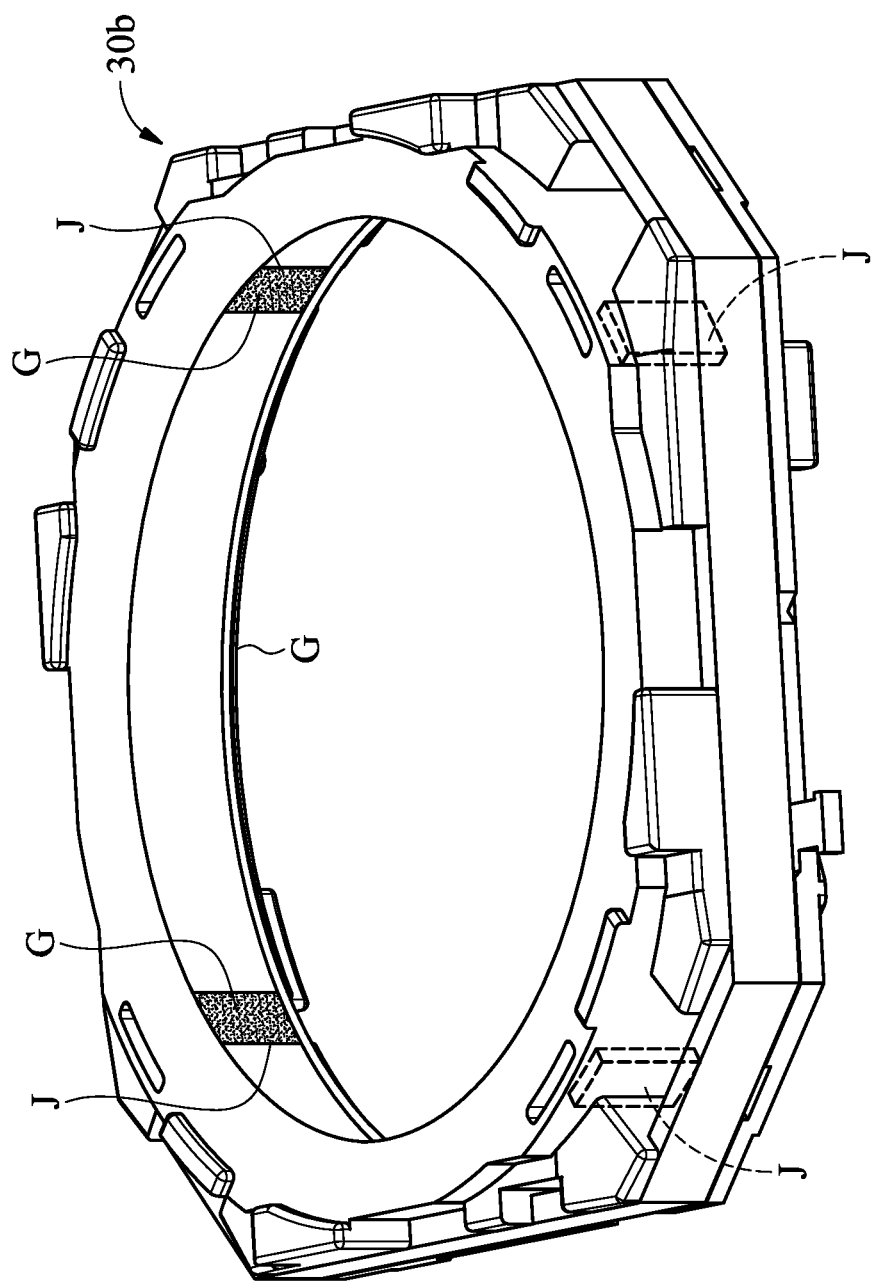
FIG. 5 is a schematic diagram of a holder according to another embodiment of the present invention.

FIG. 5 is a schematic view of a holder 30b according to another embodiment of the present invention. The main difference between the holder 30b in this embodiment and the forgoing holder 30 in FIG. 3A is that the inner side wall of the holder 30b has a plurality of grooves J, which are configured to receive the adhesive G. When the adhesive G is filled in the grooves J and be cured (or solidified), the connection and adhesion area between the holder 30b and the optical element L will be larger than the embodiment in FIG. 3A. Thus, after the inclination of the optical element L relative to the holder 30b and the fixed portion U is determined by an adjustment, the adhesive G is solidified and the connection between the two will be stronger.

Figure 6A:
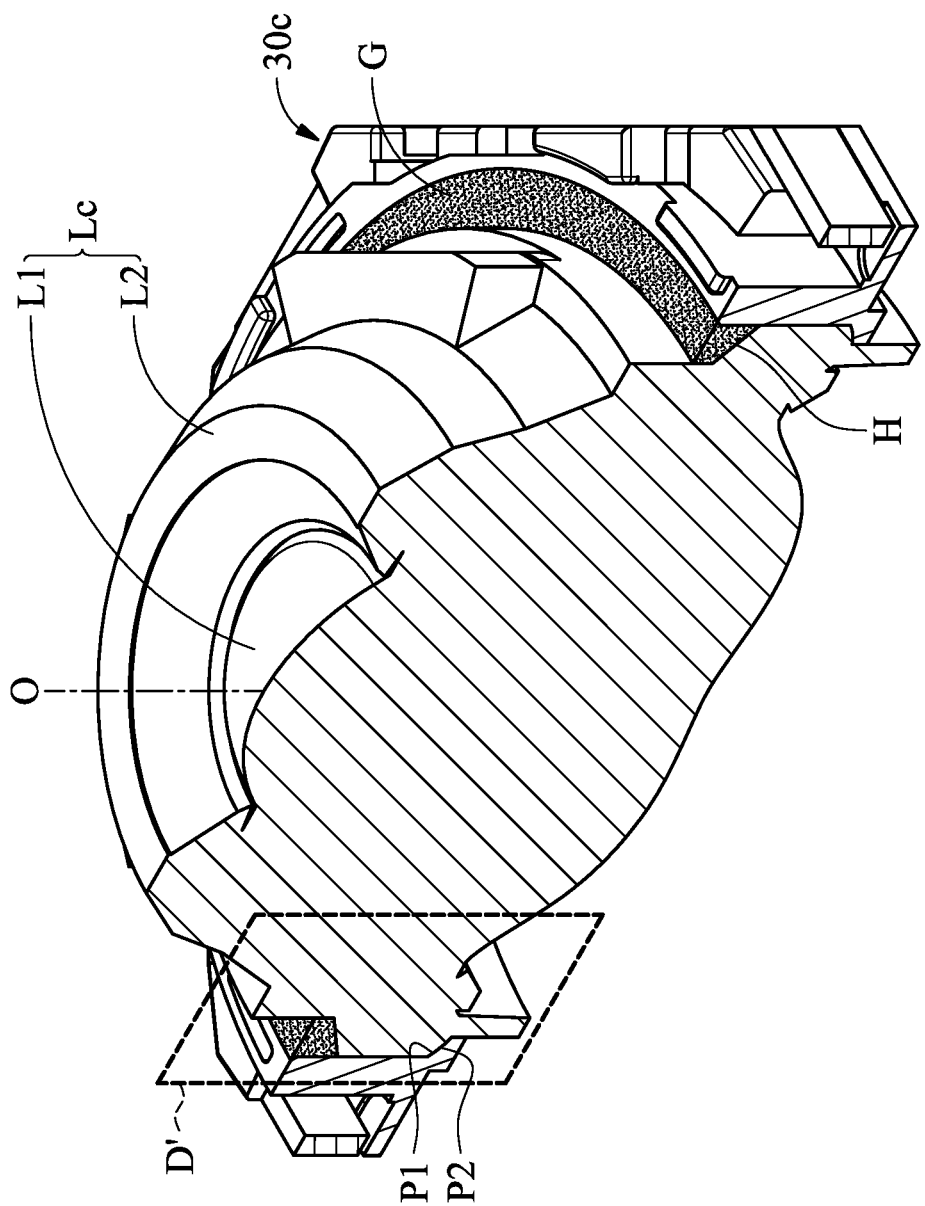
FIGS. 6A and 6B are schematic diagrams of a holder and an optical element according to another embodiment of the present invention.
Figure 6B:
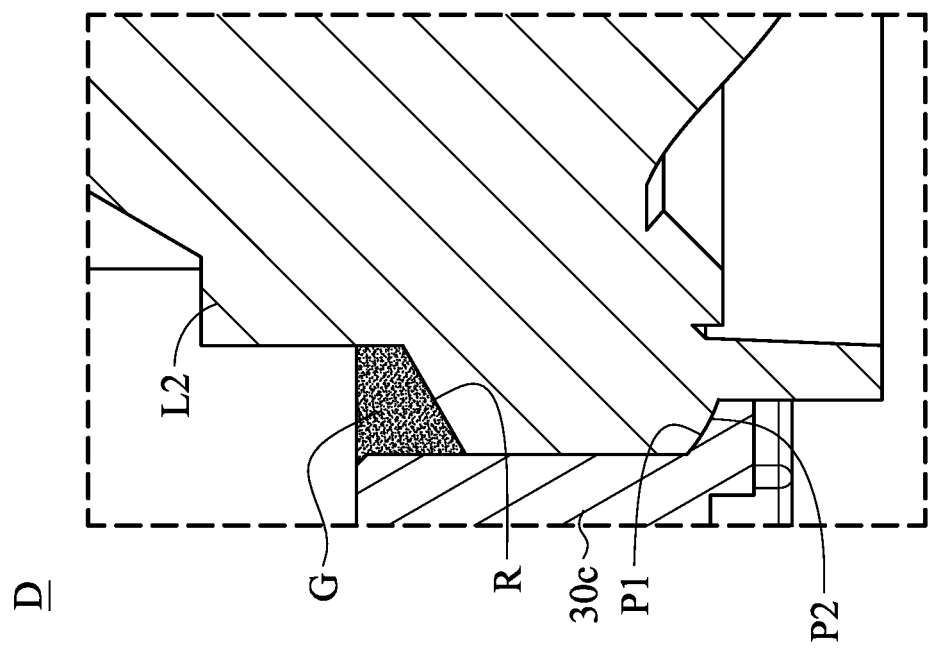

FIG. 6A is a schematic cross-sectional view of a holder member 30c and an optical element Lc according to another embodiment of the present invention, and FIG. 6B is an enlarged schematic view of a region D' in FIG. 6A. The main difference between the holder 30c and the optical element Lc in the present embodiment and the holder 30 and the optical element L in the foregoing FIG. 3A is that: the first connecting surface P1 of the holder 30c and the second connecting surface P2 of the lens barrel L2 of the optical element Lc are located at the light exit end, that is, the bottom side and the lower side end of the holder 30c; and the adhesive G is disposed at the light incident end, that is, the lower end of the holder 30c. In other words, the positions at which the first joint surface P1, the second joint surface P2, and the adhesive G of the present embodiment are disposed are reversed from the arrangement in FIG. 3A, wherein the upper and lower sides are opposite.

Figure 7:
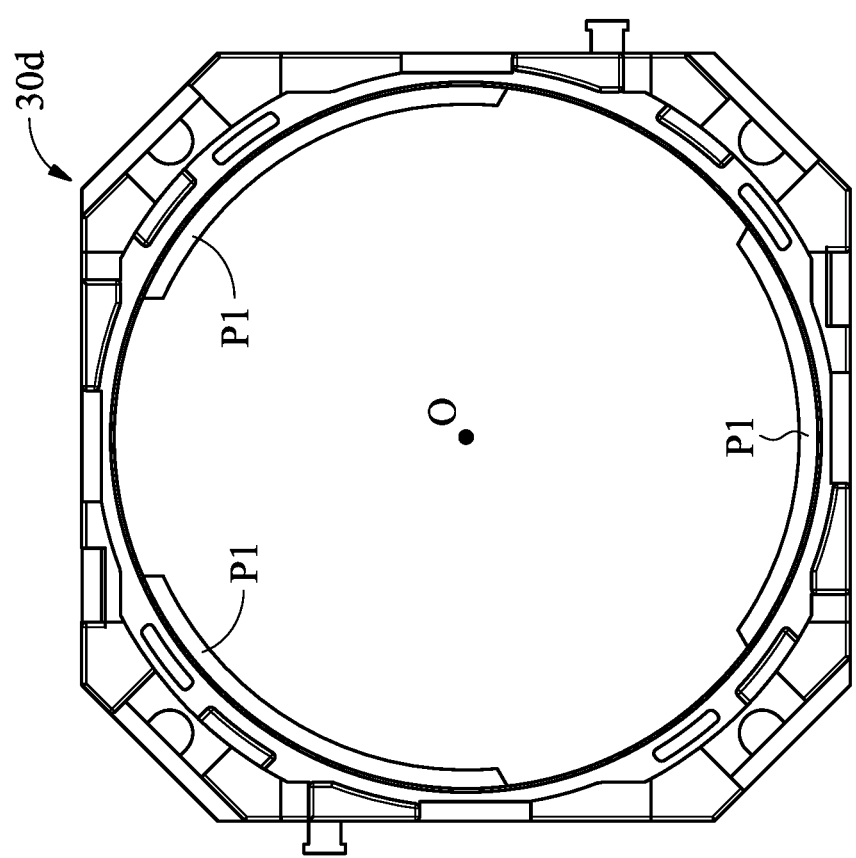
FIG. 7 is a top plan view diagram of a holder according to another embodiment of the present invention.

FIG. 7 is a top plan view of a holder 30d according to another embodiment of the present invention. The main difference between the holder 30d in the embodiment and the holder 30e in the foregoing FIG. 6A is that the holder 30d has a plurality of first connecting surfaces P1. In detail, the holder 30d includes three connecting surfaces P1, each surface P1 having curved surface, for abutting the second connecting surface P2 of the optical element Lc, and the first connecting surfaces P1 are disposed around the optical axis O. When the optical element Lc is assembled in the holder 30d, these connecting surfaces P1 form three contact areas with the second connecting surface P2. The first connecting surfaces P1 of the holder 30d in the embodiment are separated from each other, that is, there is a gap between each other. This is different from the first connecting surface P1 of the holder 30c in FIG. 6A, which is disposed around the inner side wall of the holder 30c without interruption (no gap formed).

Figure 8:
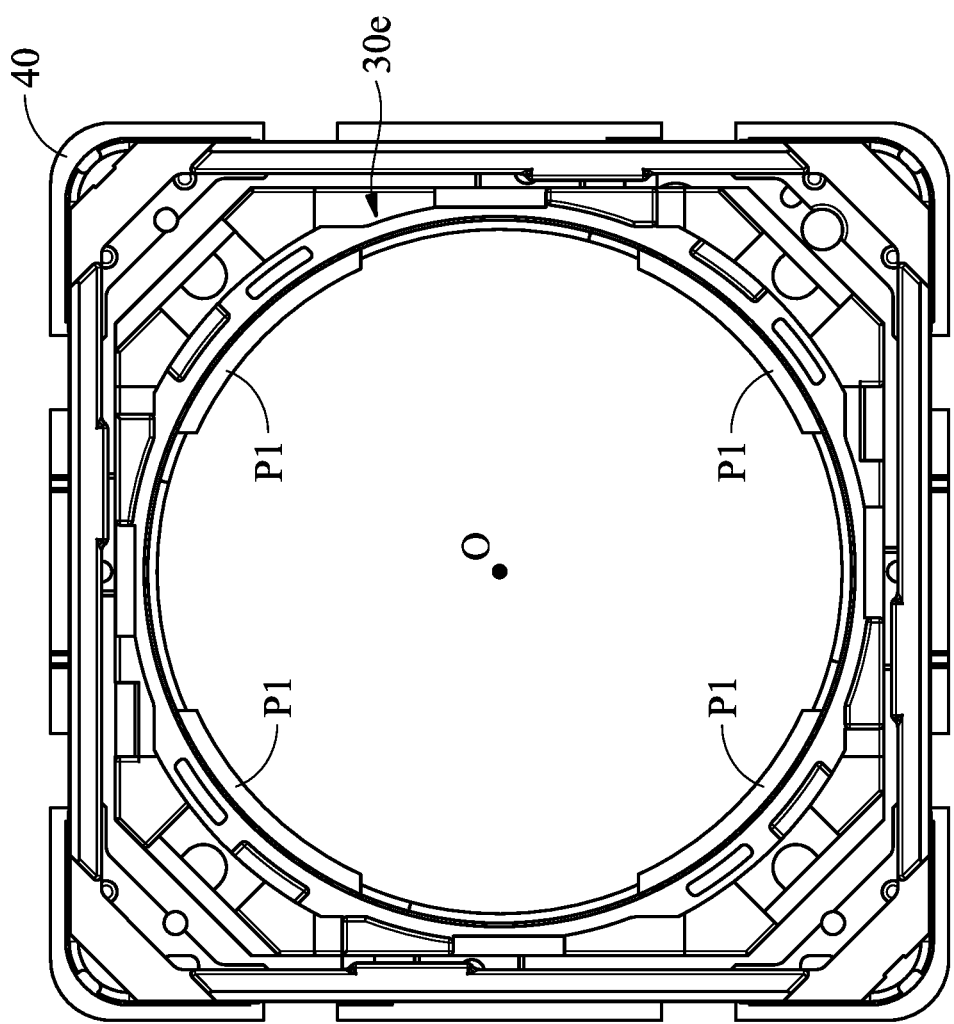
FIG. 8 is a top plan view diagram of a holder and a frame according to another embodiment of the present invention.

FIG. 8 is a top plan view of a holder 30e and the frame 40 according to another embodiment of the present invention. The main difference between the holder 30e in this embodiment and the holder 30d in FIG. 7 is that the holder 30e has four first connecting surfaces P1 separated from each other. Besides the first connecting surfaces P1 also surrounding the optical axis O and disposed on the inner side wall of holder 30e, they correspond to the four corners of the frame 40. When the optical element Lc is assembled in the holder 30e, these first connecting surfaces P1 form four contact areas with the second connecting surface P2. It should be noted that in other embodiments, the holder 30e may be deformed to have only two separate first connecting surfaces P1 (with a gap therebetween), and two contact areas are formed with the second connecting surface P2 of the lens L.

Figure 9A:
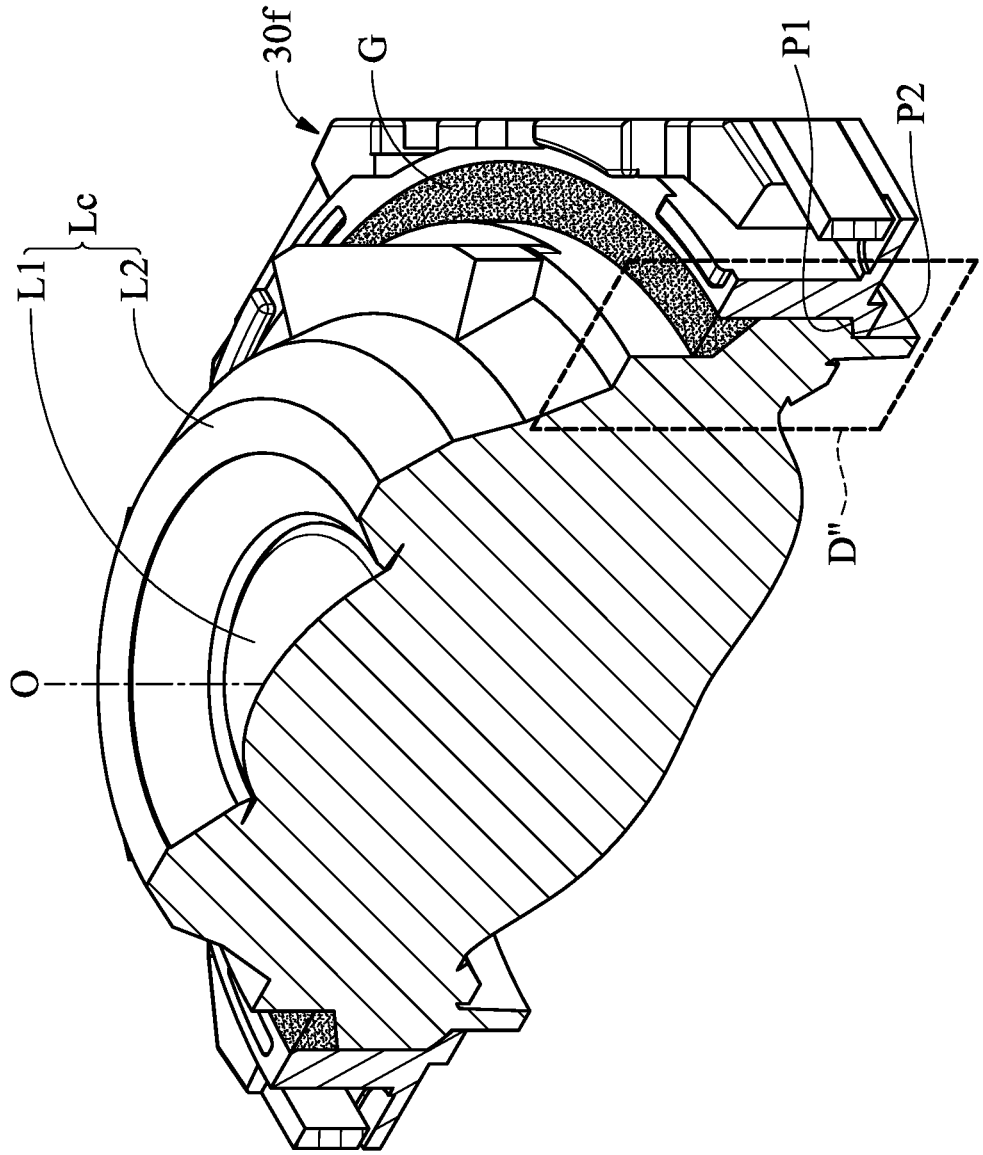
FIGS. 9A and 9B are schematic diagrams of a holder and an optical element according to another embodiment of the present invention.
Figure 9B:
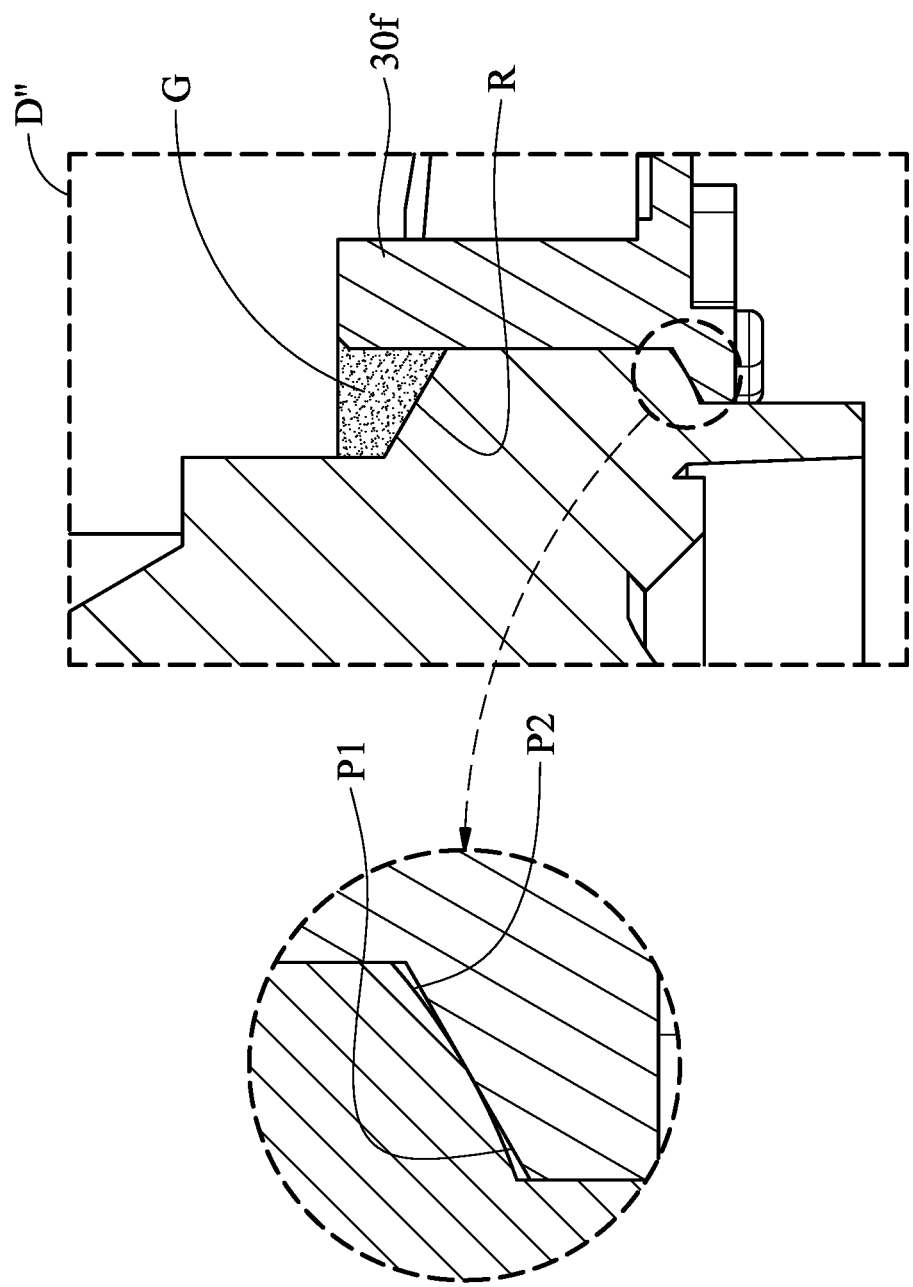

FIG. 9A is a schematic cross-sectional view showing a holder 30f and the optical element Lc according to another embodiment of the present invention, and FIG. 9B is an enlarged schematic view of a region D" in FIG. 9A. The main difference between the holder 30f in the embodiment and the holder 30c in the foregoing FIG. 6A is that the first connecting surface P1 of the holder 30f does not have a curved surface, but has an inclined (bevel) structure inclined with respect to the optical axis O. When the optical element Lc is assembled on the holder 30f, the curved surface of the second connecting surface P2 abuts the inclined structure of the first connecting surface P1.

Figure 10:
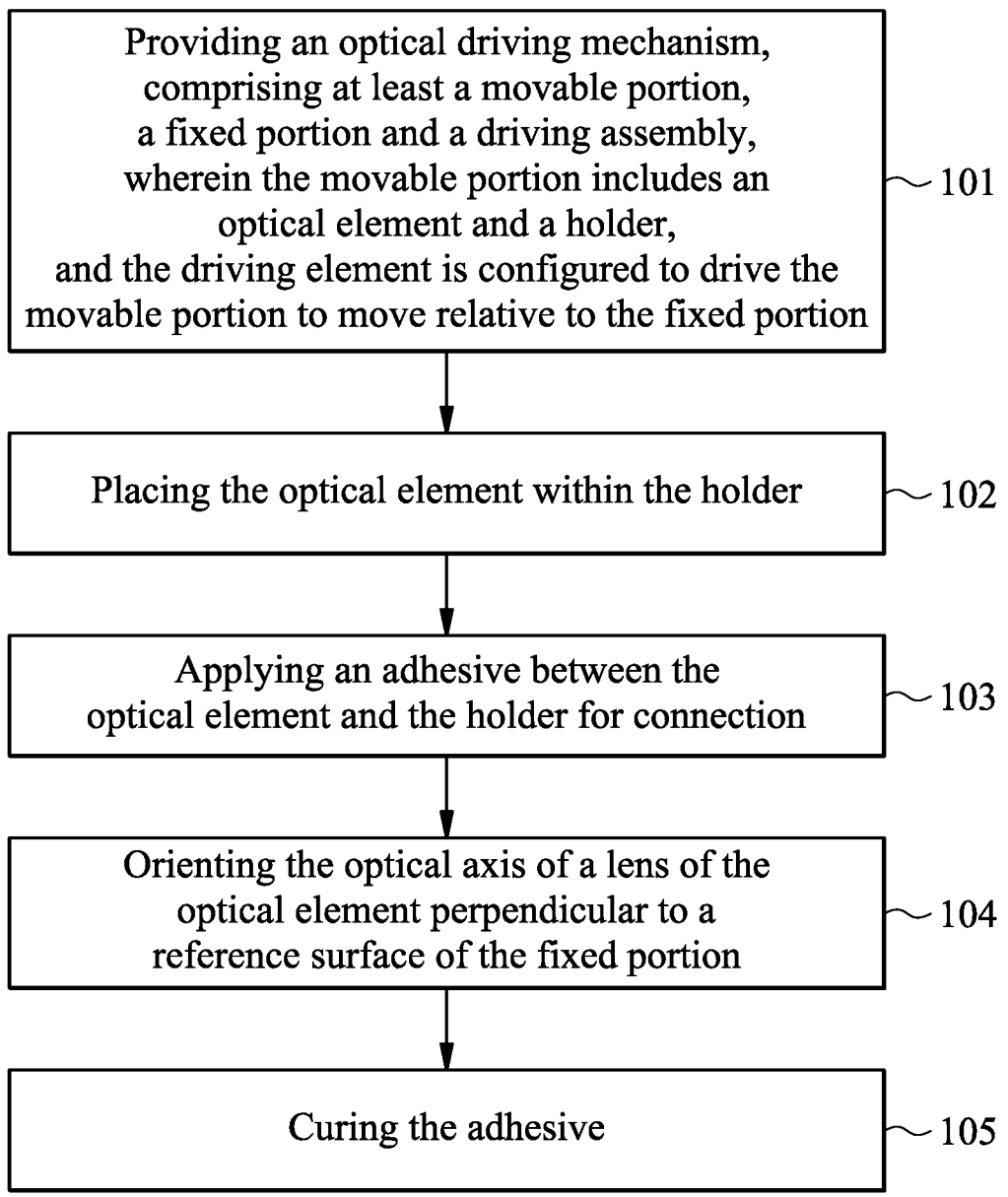
FIG. 10 is a flowchart of an assembly method of an optical driving mechanism according to an embodiment of the present invention.

According to the foregoing embodiments (FIGS. 3A-9B), the present invention also provides an assembly method of an optical driving mechanism, which primarily comprises the steps shown in FIG. 10. First, providing an optical driving mechanism 1 (step 101), comprising at least a movable portion V, a fixed portion U and a driving assembly MC, wherein the movable portion V includes an optical element L (or Lc) and a holder 30 (or 30a, 30b, 30c, 30d, 30e, 30f), the driving assembly MC can be an electromagnetic driving assembly for driving the movable portion V to move relative to the fixed portion U; then, placing the optical element L in the holder 30 (step 102); and applying an adhesive G between the optical element L and the holder 30 for connection (step 103); and adjusting an optical axis O of a lens L1 of the optical element L to perpendicular to a reference surface of the fixed portion U (step 104); and curing the adhesive G (step 105), wherein the curing method, for example, can be heat curing, or using a UV (ultraviolet) curing lamp for irradiation.

It should be noted that the optical driving mechanism provided by the aforementioned method is assembled by adjusting the position of the optical element L relative to the fixed portion U or the holder 30 after applying the adhesive G to the optical element L and the holder 30, and before the adhesive G is cured (i.e., step 104). By the adjustment and correction of this step, it ensures that the inclination of the optical element L relative to the holder 30 and/or the image sensor on or the fixed portion U is desired, to improve the product quality.

In summary, the present invention provides an optical driving mechanism, comprising a fixed portion, a movable portion and a driving assembly. The movable portion includes a holder and an optical element, wherein the holder is configured to sustain the optical element, and the optical element has a lens barrel and at least one lens. The driving assembly is configured to drive the movable portion to move relative to the fixed portion. A first connecting surface of the holder abuts a second connecting surface of the lens barrel, and at least one of the first connecting surface and the second connecting surface has a curved surface, wherein in the optical axis direction of the lens and in the direction perpendicular to the optical axis, the first connecting surface at least partially is overlapping the second connecting surface. Therefore, compared with the traditional manner of screwing, the embodiment of the invention is connected by the connecting surfaces of the holder and the optical element, and the adhesive is applied between the two, so that the optical element can be adjusted (before the adhesive solidified) relative to the image sensor in the assembly process. The degree of inclination of the optical element relative to the holder and the image sensor is adjusted and aligned to maintain the optical element in the proper position to improve the quality of the optical mechanism. In addition, the manner of bonding through the connecting surfaces also saves space compared to the conventional thread method, and also allows more space for the other components of optical mechanism be arranged, which has more flexible configuration and can achieve miniaturization. Furthermore, the assembly process of the optical element on the holder and the base of the fixed portion can be simplified, and it effectively improves the alignment accuracy between the components (correction adjustment can be made during assembly), thereby greatly improving the quality of the device.

In addition, an embodiment of the present invention also provides an assembly method of an optical driving mechanism, comprising: providing an optical driving mechanism, the optical driving mechanism at least includes a movable portion, a fixing portion, and a driving assembly, wherein the movable portion includes an optical element and a holder, and the driving assembly is configured to drive the movable portion to move relative to the fixed portion; placing the optical element in the holder; applying an adhesive between the optical element and the holder for connection; orienting an optical axis of a lens of the optical element perpendicular to a reference surface of the fixed portion; and curing the adhesive. By adjusting the position of the optical element relative to the fixed portion before the adhesive is cured, it will be advantageous to improve the quality of the optical product.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An optical driving mechanism, comprising:
   a fixed portion;
   a movable portion, disposed on the fixed portion and including a holder and an optical element, wherein the holder is configured to sustain the optical element, and the optical element has a lens barrel and at least one lens; and
   a driving assembly, configured to drive the movable portion to move relative to the fixed portion;
   wherein a first connecting surface of the holder abuts a second connecting surface of the lens barrel, and at least one of the first connecting surface and the second connecting surface has a curved surface, wherein in the direction of an optical axis of the lens and in a direction perpendicular to the optical axis, the first connecting surface at least partially overlaps the second connecting surface;
   wherein the holder comprises a hollow portion, for containing the lens barrel.

2. The optical driving mechanism as claimed in claim 1, wherein the curved surface is not parallel to the optical axis.

3. The optical driving mechanism as claimed in claim 1, wherein both the first connecting surface and the second connecting surface are curved surfaces.

4. The optical driving mechanism as claimed in claim 3, wherein the radius of curvature of the first connecting surface is greater than or equal to the radius of curvature of the second connecting surface.

5. The optical driving mechanism as claimed in claim 1, wherein the holder has a plurality of first connecting surfaces abutting the second connecting surface and surrounding the optical axis.

6. The optical driving mechanism as claimed in claim 5, wherein at least two contact areas are formed between the first connecting surfaces and the second connecting surface.

7. The optical driving mechanism as claimed in claim 6, wherein there is a gap between the first connecting surfaces.

8. The optical driving mechanism as claimed in claim 1, wherein the second connecting surface has a curved surface, and the first connecting surface has an inclined structure which is inclined relative to the optical axis.

9. The optical driving mechanism as claimed in claim 1, wherein the first connecting surface and the second connecting surface are located at a light incident end or a light exit end of the optical driving mechanism.

10. The optical driving mechanism as claimed in claim 1, further comprising an adhesive disposed between the holder and the lens barrel of the optical element.

11. The optical driving mechanism as claimed in claim 10, wherein the lens barrel has a recessed portion formed on the outer side of the lens barrel, and the adhesive is disposed in the recess portion and between the lens barrel and the holder.

12. The optical driving mechanism as claimed in claim 10, wherein the holder has a receiving slot located at a light incident end of the optical driving mechanism, and the adhesive is disposed in the receiving slot.

13. The optical driving mechanism as claimed in claim 10, wherein the inner side wall of the holder has a recess configured to receive the adhesive.

14. The optical driving mechanism as claimed in claim 10, wherein the first connecting surface and the second connecting surface are located at either a light incident end or a light exit end of the optical driving mechanism, and the adhesive is located at the other of the light incident end or the light exit end.

15. An assembly method of an optical driving mechanism, comprising:
  providing the optical driving mechanism as claimed in claim 10;
  disposing the optical element in the holder;
  applying the adhesive between the optical element and the holder;
  orienting the optical axis of a lens of the optical element perpendicular to a reference surface of the fixed portion; and
  curing the adhesive.

* * * * *